(12) United States Patent
Chen et al.

(10) Patent No.: US 9,461,956 B2
(45) Date of Patent: Oct. 4, 2016

(54) ADAPTIVE GUIDANCE FOR MANAGING A COMMUNICATIONS REPOSITORY

(71) Applicant: International Business Machines Corporation, Armonk, NY (US)

(72) Inventors: Feng-wei Chen, Raleigh, NC (US); Joseph D. Johnson, Raleigh, NC (US); Yongcheng Li, Raleigh, NC (US); Samuel R. McHan, Jr., Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 14/197,830

(22) Filed: Mar. 5, 2014

(65) Prior Publication Data

US 2015/0256489 A1    Sep. 10, 2015

(51) Int. Cl.
*G06F 15/16* (2006.01)
*H04L 12/58* (2006.01)

(52) U.S. Cl.
CPC ............... *H04L 51/32* (2013.01); *H04L 51/12* (2013.01)

(58) Field of Classification Search
CPC ........ H04L 12/58; H04L 51/32; H04L 51/02
USPC .................................................. 709/206, 208
See application file for complete search history.

(56) References Cited

U.S. PATENT DOCUMENTS

| | | | |
|---|---|---|---|
| 8,099,429 B2 | 1/2012 | Deyo et al. | |
| 8,166,392 B2 | 4/2012 | Horvitz | |
| 8,271,590 B2 | 9/2012 | Dreyfus et al. | |
| 2009/0299970 A1 | 12/2009 | Rodriguez | |
| 2010/0153325 A1* | 6/2010 | Amoroso | G06Q 10/107 706/46 |
| 2011/0010182 A1 | 1/2011 | Turski et al. | |
| 2011/0087741 A1 | 4/2011 | Stern et al. | |
| 2012/0290662 A1* | 11/2012 | Weber | G06N 99/005 709/206 |

* cited by examiner

*Primary Examiner* — Vivek Srivastava
*Assistant Examiner* — Normin Abedin
(74) *Attorney, Agent, or Firm* — Maeve M. Carpenter (57) ABSTRACT

A tool for analyzing accessible data to provide recommendations to a user for how to manage communications. The tool receives a request to provide a recommendation for how to manage a specific communication. The tool requests accessible data for the specific communication. The tool determines a recommendation for how to manage the specific communication. The tool presents the recommendation for how to manage the specific communication.

11 Claims, 3 Drawing Sheets

ADAPTIVE GUIDANCE FOR MANAGING A COMMUNICATIONS REPOSITORY

FIELD OF THE INVENTION

The present invention relates generally to electronic communications, and more particularly to providing adaptive guidance for managing a communications repository.

BACKGROUND OF THE INVENTION

Unified Communications is the integration of real-time communication services, such as instant messaging, telephone, video conferencing, data sharing, and speech recognition, with non-real-time communication services, such as integrated voicemail, electronic mail (e-mail), text message (SMS), and facsimile. Unified Communications is not necessarily a single product, but a set of products that provides a consistent unified user-interface and user-experience across multiple devices and media-types. Unified Communications solutions aggregate multiple channels of communication into a single system, and provide access for a variety of clients. For example, a voice-mail may be transcribed and sent as a text message, an e-mail, or both. Simplified means of communication is resulting in an explosion of communication volume, and as such, people are spending a significant portion of their day reading and classifying communications for reference, action, or follow-up.

Classifying communications, such as e-mail, often involves a laborious task of creating and managing taxonomy for the messages and attachments, flagging messages for future searching, modifying expiration dates for important messages, purging irrelevant or unimportant messages, and looking through filtered messages to find potentially important messages mistakenly identified as spam.

SUMMARY

Aspects of an embodiment of the present invention disclose a method, system, and computer program product for analyzing accessible data to provide recommendations to a user for how to manage communications. The method includes receiving a request to provide a recommendation for how to manage a specific communication. The method includes requesting accessible data for the specific communication. The method includes determining a recommendation for how to manage the specific communication. The method includes presenting the recommendation for how to manage the specific communication.

DETAILED DESCRIPTION

Embodiments of the present invention recognize that when classifying communications, recommending actions based on a recipient's previous behavior, or a sender's prior categorization of a message for a recipient, lacks the context of the recipient's social network.

Embodiments of the present invention provide the capability to more effectively and efficiently manage a communication by considering behavioral patterns of a user's social network regarding similar communications. Embodiments of the present invention provide the capability to determine projected consequences on a user, as well as projected consequences on a communications system, if the behavioral patterns continue. Embodiments of the present invention provide the capability to determine whether a user's action on the communication (i.e., how the communication is managed) should follow the behavioral patterns of the user's social network, or follow an anti-pattern to the behavioral patterns of the user's social network based, at least in part, on cost and effect analysis of the behavioral patterns. Embodiments of the present invention provide the capability to determine a weighted recommendation for user action that facilitates effective and efficient management of the communication.

Implementation of such embodiments may take a variety of forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
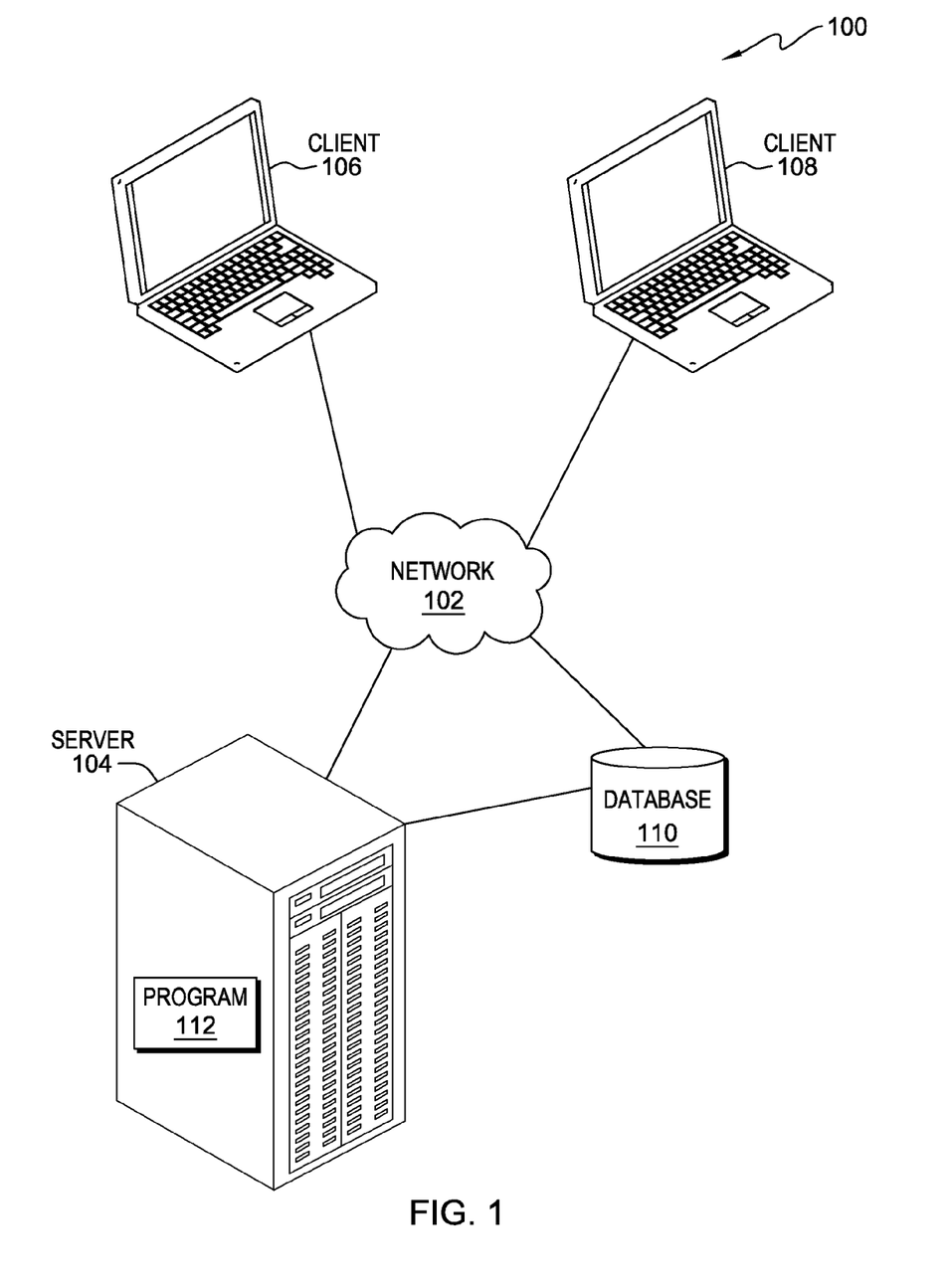
FIG. 1 is a functional block diagram illustrating a data processing environment, generally designated 100, in accordance with an embodiment of the present invention.

The present invention will now be described in detail with reference to Figures. FIG. 1 illustrates a data processing environment, generally designated 100, including network 102, server computer 104, multiple client computers such as client computer 106 and client computer 108, and database 110, in accordance with an exemplary embodiment of the present invention.

In the exemplary embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server computer 104 and client computers 106 and 108 are interconnected by network 102. Network 102 can be any combination of connections and protocols capable of supporting communications between server computer 104, client computer 106, client computer 108, and database 110. Network 102 may also be implemented as a number of different types of networks, such as an intranet, a local area network (LAN), a virtual local area network (VLAN), or a wide area network (WAN). FIG. 1 is intended as an example, and not as an architectural limitation for the different embodiments.

In the exemplary embodiment, server computer 104 may be, for example, a server computer system such as a management server, web server, or any other electronic device or computing system capable of sending and receiving data. In another embodiment, server computer 104 represents a "cloud" of computers interconnected by one or more networks, where server computer 104 is a computing system utilizing clustered computers and components to act as a single pool of seamless resources when accessed through network 102. This is a common implementation for data centers in addition to cloud computing applications. In the exemplary embodiment, server computer 104 includes an electronic messaging program (not shown) capable of receiving, sending, and managing electronic messages, such as e-mail, instant messages and text messages, between client computers 106 and 108.

In the exemplary embodiment, server computer 104 includes program 112 for analyzing accessible data, such as message metadata, user metadata, server information, social network behavior, and base-line recommendations, to provide recommendations to a user for how to manage communications. Program 112 includes a plurality of programs and functions to analyze accessible data to provide a recommendation for how to manage communications. In the exemplary embodiment, program 112, in response to receiving a request for a recommendation on how to manage a communication, analyzes accessible data associated with the unique ID of the communication and of the users (i.e., sender and recipient) to provide a specific recommendation (e.g., reply, delete, forward, file in a folder, etc.) for how to manage the specific communication.

In the exemplary embodiment, client computers 106 and 108 are clients to server computer 104, and may be, for example, a notebook, a laptop computer, a tablet computer, a personal digital assistant (PDA), a smart phone, a thin client, or any other electronic device or computing system capable of communicating with server computer 104 through network 102. Client computers 106 and 108 include a processor (not shown) and one or more data storage devices (not shown). The processor can be any custom made or commercially available processor, a central processing unit (CPU), an auxiliary processor among several processors associated with the computer, a semiconductor based microprocessor, a macro processor, or generally any device capable of executing instructions. The one or more data storage devices can be at least one of the random access memory (RAM), read only memory (ROM), a cache, a stack, or the like that can temporarily or permanently store electronic data. In the exemplary embodiment, client computers 106 and 108 include an electronic messaging program for communicating securely with server computer 104, and provide respective user interfaces for viewing and composing electronic messages.

In the exemplary embodiment, database 110 is a central database located on server computer 104 or on another device remotely from server computer 104 and client computers 106 and 108, accessible via network 102. Database 110 can include one or more sub-databases located on one or more client computers, such as client computer 106 or client computer 108, which communicate user data. In the exemplary embodiment, database 110 stores a unique ID for each outgoing communication, as well as associated metadata for each outgoing communication, such as statistics on the communication (e.g., message sender, message recipient, message size, message content, etc.), and how it was managed by one or more users receiving the communication (e.g., number of users who received, deleted, forwarded, replied, and filed the message, as well as dwell time, latency, etc.). In the exemplary embodiment, database 110 stores a unique ID for each user, as well as data about specific behaviors (i.e., historical patterns of how the user managed similar communications) of the user based on communication metadata. For example, user 1 deletes messages from user 2 80% of the time, and files messages from user 2 20% of the time.

Data processing environment 100 may include additional server computers, client computers, displays and other devices not shown.

Server computer 104 and client computers 106 and 108, each maintain respective internal components, and respective external components. In general, server computer 104 and client computers 106 and 108 can be any programmable electronic device as described in further detail with respect to FIG. 3.

Figure 2:
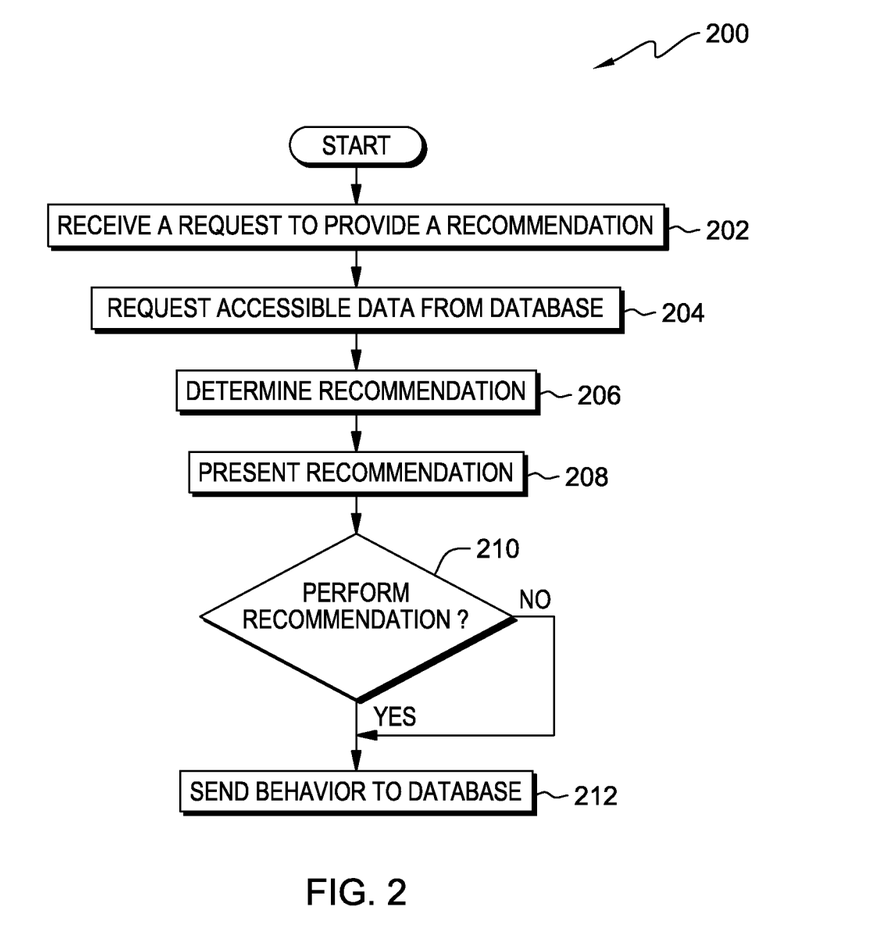
FIG. 2 is a flowchart of an exemplary process flow, generally designated 200, for analyzing accessible data to provide recommendations to a user for how to manage communications, in accordance with an embodiment of the present invention.

FIG. 2 is a flowchart depicting the steps of program 112 for analyzing accessible data to provide recommendations to a user for how to manage communications, in accordance with an embodiment of the present invention.

Program 112 receives a request to provide a recommendation for how to manage a specific communication (step 202). In the exemplary embodiment, program 112 receives a request to provide a recommendation for how to manage a specific communication directly from a user. A link initiated within the communications interface submits the request to receive a recommendation to program 112. For example, a user receives an incoming communication and submits a request to program 112 to provide a recommendation for how to manage the specific communication. The user may submit the request by activating a link, such as "Request Recommendation," available within the communications interface of the user's electronic messaging program. In another embodiment, in response to a user receiving an incoming communication, program 112 may receive a request to provide a recommendation for how to manage the incoming communication automatically. Program 112 may receive a request to provide a recommendation every time a user receives an incoming message, without any input from the user. For example, a user may configure their communications interface to automatically submit a request whenever an incoming message enters their inbox, when the user is unavailable to manage the incoming message manually, or whenever actions are taken on existing similar messages within their inbox (e.g., reply, delete, forward, file, etc.).

In response to receiving a request to provide a recommendation on how to manage a specific communication, program 112 requests accessible data from database 110 (step 204). In the exemplary embodiment, program 112 requests accessible data, including user metadata and communication metadata, from database 110. Program 112 can request user metadata, such as data regarding the specific behaviors of a sender and the specific behaviors of one or more recipients with respect to a communication, from database 110. For example, each user may have a unique ID, such as an email address, user ID, etc., that identifies the user within database 110. When a user manages a communication, the user's specific behaviors regarding the communication are stored in database 110 under the user's unique ID. Stored behaviors regarding communications develop historical patterns for how a user manages communications based on a plurality of factors, such as subject matter of the communication, sender of the communication, and recipients of similar communications. Program 112 may retrieve user metadata for any user (i.e., senders and recipients) associated with a specific communication having a pending request to provide a recommendation for how to manage the communication. Program 112 may also retrieve user metadata for any users associated with any communication similar to a specific communication having a pending request to provide a recommendation for how to manage the communication. Program 112 can retrieve communication metadata, such as data regarding participants to the communication (i.e., sender and recipient), size of the communication, and the number of users who received, deleted, forwarded, replied, and filed the communication, from database 110. For example, each communication may have a unique ID, such as a serial number, that identifies the communication within database 110. Outgoing communications may be assigned a unique ID and communication metadata associated with each outgoing communication may be stored in database 110 under each communication's unique ID. Stored communication metadata develops a catalog of prior communications that can be cross referenced for similarity to a specific communication having a pending request to provide a recommendation for how to manage the specific communication.

In response to retrieving requested accessible data, program 112 determines a recommendation for how to manage the specific communication (step 206). In the exemplary embodiment, program 112 determines a recommendation for how to manage the specific communication by determining social behavioral patterns relating to the specific communication or similar communications, as well as projected consequences on the user or the communications system if the social behavioral patterns continue, and based, at least in part, on the historical social behavioral patterns and projected consequences, determining whether the user's handling of the specific communication should follow the social behavioral patterns. Program 112 utilizes the user metadata and communication metadata received from database 110 to determine social behavioral patterns and projected consequences on the user or the communications system if the social behavioral patterns continue. Program 112 determines social behavioral patterns by determining the behavior of other recipients within data processing environment 100 with respect to the specific communication, or the behavior of other recipients with respect to similar communications (i.e., how other recipients within the user's social network have managed the same or similar communications). Once a historical social behavioral pattern is determined, program 112 determines a weighted value, based, at least in part on, functional proximity to the user of recipients within the user's social network (i.e., immediate social network or extended social network), how communications are managed by recipients with similar job responsibilities to the user, and developing trends among recipients that meet or exceed a predetermined threshold, for use in determining a recommendation. For example, a user (i.e., recipient) receives a communication (e.g., non-urgent e-mail) from a sender who is within the user's social network (e.g., within the same functional area, work department, etc.). The user may be one of a plurality of recipients receiving the same communication. If one or more of the plurality of recipients are within the user's immediate social network, and at least 51 percent of the plurality of recipients within the user's immediate social network has decided to delete the communication, program 112 may determine a high weighted value based on the percentage of recipients within the user's immediate social network taking similar actions, and determine a recommendation to delete the communication.

In another embodiment, social behavioral patterns might be determined by expected behavior following receiving a communication. For example, a user receives a communication from a manager, but does not immediately reply. Where historical social behavioral patterns suggest that the user may expect a follow-up communication from the manager within 48 hours, program 112 determines a recommendation to reply sooner than 48 hours. If the manager sends a follow up communication within 48 hours of receipt of the first communication, program 112 may weigh this indicator heavily and be more aggressive in determining a recommendation to reply, such as present a reminder to the user when opening the inbox to give attention to the communication.

In another embodiment, recommendations may be based on anti-patterns that limit the impact of projected consequences if the social behavioral patterns continue. For example, a user (i.e., recipient) receives a communication (e.g., chain mail) from a sender who is within the user's social network (e.g., within the same functional area, work department, etc.). The user may be one of a plurality of recipients receiving the same communication. If one or more of the plurality of recipients are within the user's immediate social network, and at least 51 percent of the plurality of recipients within the user's immediate social network has decided to forward the communication, program 112 may determine a recommendation to forward the communication. However, program 112 may determine that the projected consequences of the social behavioral pattern continuing (i.e., high forwarding rate and an additional 56 GB of storage consumed if the user forwards the communication) does not benefit the communications system, and therefore, in determining a weighted value based on projected consequences (i.e., detriment to the communications system weighted more heavily than following the pattern to forward the communication), determine an anti-pattern recommendation to not forward the communication.

In response to determining a recommendation for how to manage the specific communication, program 112 presents the recommendation to the user (step 208). In the exemplary embodiment, program 112 presents the recommendation to the user by displaying the recommendation in one or more of: pop-up dialogs, in-line messages, automatic rules, and dynamic views grouping emails by action taken. For example, the specific recommendation could be focused, such as "Program 112 suggests you delete this email," or broad, such as "Four of your colleagues have deleted this email, and two of your colleagues have forwarded this email." In the exemplary embodiment, program 112 presents the recommendation to the user actively (i.e., the recommendation is presented to the user automatically) or passively (i.e., the recommendation is presented to the user when the user requests the recommendation through a user interface, such as a pop-up dialog, in-line message, etc.). Active and passive notification can utilize an indicator to show new recommendation updates. For example, initially, many of the email recipients kept the email in a folder, and program 112 determines a recommendation for keeping the email in the folder, however, later on, recipients begin to delete the email, therefore, program 112 determines a new (i.e., updated) recommendation for handling the communication, such as deleting the email. In the exemplary embodiment, program 112 presents updated recommendations to the user both actively and passively. For example, where program 112 presents the updated recommendation actively, a new message can be sent to the user automatically to present the updated recommendation. Alternatively, where program 112 presents the updated recommendation passively, an icon (e.g. flashing icon, different color, shape, or orientation of icons, etc.) may be used to alert the user that an updated recommendation is available.

Program 112 determines whether the recommendation for how to manage the communication was followed (step 210). In the exemplary embodiment, program 112 determines whether the recommendation presented to the user was followed with respect to the specific communication by monitoring how the specific communication was managed by the user. If program 112 determines that the user followed the recommendation, then program 112 sends usage information (i.e., the user's behavior regarding the specific communication) to database 110 to store as user metadata and communication metadata (yes branch, step 212). If program 112 determines that the user did not follow the recommendation, either by taking contrarian action or by taking no action at all, then program 112 sends the usage information (i.e., user's behavior regarding the specific communication) to database 110 to store as user metadata and communication metadata.

In another embodiment, program 112 provides the capability to allow the user to opt-out of sending all or part of the usage information to database 110 to be stored as metadata. For example, the user may allow statistics to be kept of how they manage incoming communications, except for a specific folder taxonomy of where the communications are filed.

Figure 3:
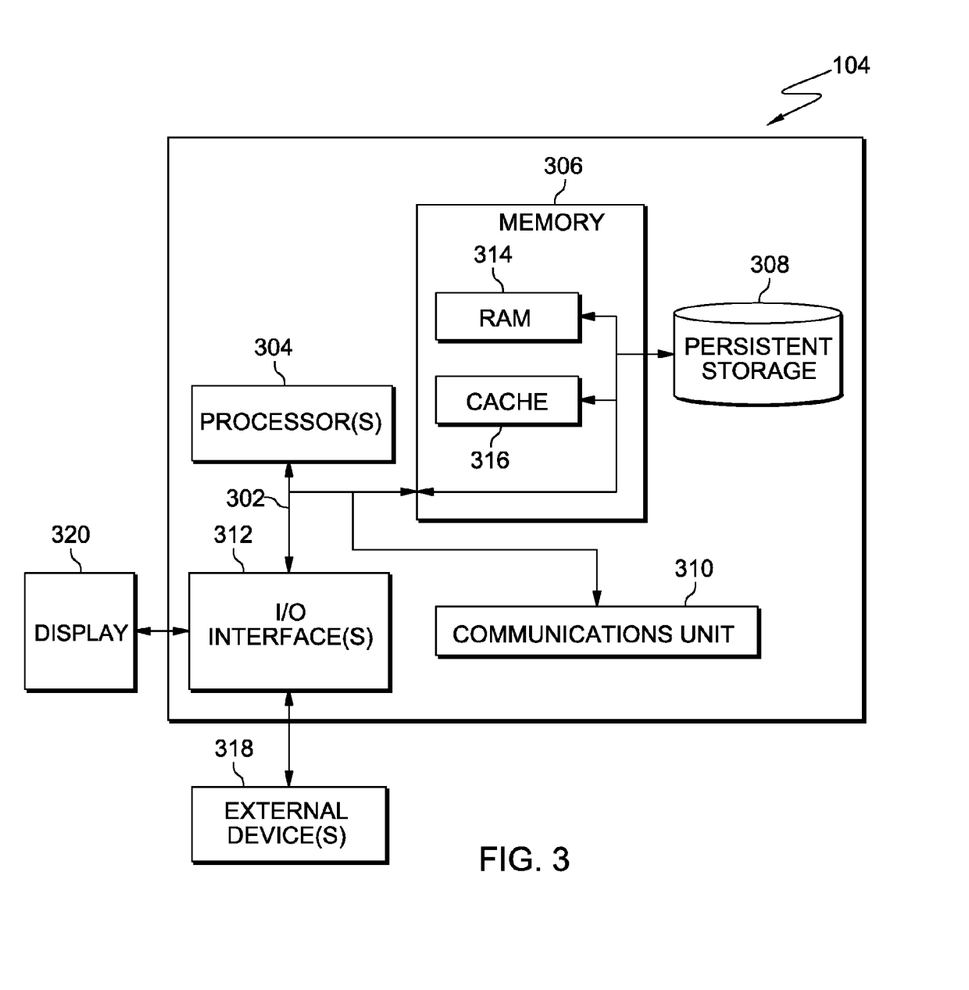
FIG. 3 is a block diagram depicting components of a data processing system (such as the server computer and client computers of FIG. 1), in accordance with an embodiment of the present invention.

FIG. 3 depicts a block diagram of components of server computer 104, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 104 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Program 112 can be stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including client computers 106 and 108. In these examples, communications unit 310 includes one or more network interface cards. Communications unit 310 may provide communications through the use of either or both physical and wireless communications links. Program 112 may be downloaded to persistent storage 308 through communications unit 310.

I/O interface(s) 312 allows for input and output of data with other devices that may be connected to server computer 104. For example, I/O interface(s) 312 may provide a connection to external device(s) 318 such as a keyboard, a keypad, a touch screen, and/or some other suitable input device. External device(s) 318 can also include portable computer-readable storage media such as, for example, thumb drives, portable optical or magnetic disks, and memory cards. Software and data used to practice embodiments of the present invention, e.g., program 112, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for improving communications systems by analyzing accessible data and a user's social networking behavioral patterns to provide recommendations for efficient and effective management of communications within the communications system, the method comprising:
  receiving, by one or more computer processors, a request to provide a recommendation for how to manage a specific communication;
  requesting, by one or more computer processors, accessible data for the specific communication;

determining, by one or more computer processors, a recommendation for how to manage the specific communication, wherein determining the recommendation includes determining, based, at least in part on, accessible data for the specific communication, a social behavioral pattern and projected consequences if the social behavioral pattern continues, wherein determining a social behavioral pattern includes determining an expected behavior of the recipient with respect to the specific communication, a behavior of a plurality of other recipients with respect to the specific communication, a behavior of a plurality of other recipients with respect to similar communications, and a behavior of a plurality of other recipients within the user's social network with respect to the specific or similar communications;

wherein determining projected consequences if the social behavioral pattern continues, further comprises determining a weighted value, based, at least in part on: an impact on a communications system if the social behavioral pattern continues; an impact on a recipient if the social behavioral pattern continues; an impact on the communications system if an anti-pattern to the social behavioral pattern continues; and an impact on the recipient if an anti-pattern to the social behavioral pattern continues; and presenting, by one or more computer processors, the recommendation for how to manage the specific communication.

2. The method of claim 1, wherein requesting accessible data for the specific communication, further comprises retrieving one or more of:
message metadata;
user metadata; and
communications server information.

3. The method of claim 1, wherein determining a social behavioral pattern, further comprises determining a weighted value, based, at least in part on, one or more of:
historical behavioral patterns relating to the specific or similar communications;
functional proximity of a plurality of recipients within the user's social network to the user;
a history of how communications are managed by a plurality of recipients with similar job responsibilities to the user; and
developing trends among a plurality of recipients that meet or exceed a predetermined threshold.

4. The method of claim 1, wherein presenting the recommendation for how to manage the specific communication, further comprises presenting the recommendation actively, passively, or both actively and passively, wherein an active recommendation is presented automatically to the user, and a passive recommendation is presented only when the user requests the recommendation.

5. A computer program product for improving communications systems by analyzing accessible data and a user's social networking behavioral patterns to provide recommendations for efficient and effective management of communications within the communications system, the computer program product comprising:
one or more computer-readable storage devices and program instructions stored on the one or more computer-readable storage devices, the program instructions comprising:
program instructions to receive, by one or more computer processors, a request to provide a recommendation for how to manage a specific communication;
program instructions to request, by one or more computer processors, accessible data for the specific communication;
program instructions to determine, by one or more computer processors, a recommendation for how to manage the specific communication, wherein determining the recommendation includes determining, based, at least in part on, accessible data for the specific communication, a social behavioral pattern and projected consequences if the social behavioral pattern continues, wherein determining a social behavioral pattern includes determining an expected behavior of the recipient with respect to the specific communication, a behavior of a plurality of other recipients with respect to the specific communication, a behavior of a plurality of other recipients with respect to similar communications, and a behavior of a plurality of other recipients within the user's social network with respect to the specific or similar communications;

wherein determining projected consequences if the social behavioral pattern continues, further comprises determining a weighted value, based, at least in part on: an impact on a communications system if the social behavioral pattern continues; an impact on a recipient if the social behavioral pattern continues; an impact on the communications system if an anti-pattern to the social behavioral pattern continues; and an impact on the recipient if an anti-pattern to the social behavioral pattern continues; and program instructions to present, by one or more computer processors, the recommendation for how to manage the specific communication.

6. The computer program product of claim 5, wherein program instructions to request accessible data for the specific communication, further comprise program instructions to retrieve one or more of:
message metadata;
user metadata; and
communications server information.

7. The computer program product of claim 5, wherein program instructions to determine a social behavioral pattern, further comprise program instructions to determine a weighted value, based, at least in part on, one or more of:
historical behavioral patterns relating to the specific or similar communications;
functional proximity of a plurality of recipients within the user's social network to the user;
a history of how communications are managed by a plurality of recipients with similar job responsibilities to the user; and
developing trends among a plurality of recipients that meet or exceed a predetermined threshold.

8. The computer program product of claim 5, wherein program instructions to present the recommendation for how to manage the specific communication, further comprise program instructions to present the recommendation actively, passively, or both actively and passively, wherein an active recommendation is presented automatically to the user, and a passive recommendation is presented only when the user requests the recommendation.

9. A computer system for improving communications systems by analyzing accessible data and a user's social networking behavioral patterns to provide recommendations for efficient and effective management of communications within the communications system, the system comprising:
one or more computer processors;
one or more computer-readable storage devices;

program instructions stored on at least one of the one or more computer-readable storage devices for execution by at least one of the one or more computer processors, the program instructions comprising:

program instructions to receive, by one or more computer processors, a request to provide a recommendation for how to manage a specific communication;

program instructions to request, by one or more computer processors, accessible data for the specific communication;

program instructions to determine, by one or more computer processors, a recommendation for how to manage the specific communication, wherein determining the recommendation includes determining, based, at least in part on, accessible data for the specific communication, a social behavioral pattern and projected consequences if the social behavioral pattern continues, wherein determining a social behavioral pattern includes determining an expected behavior of the recipient with respect to the specific communication, a behavior of a plurality of other recipients with respect to the specific communication, a behavior of a plurality of other recipients with respect to similar communications, and a behavior of a plurality of other recipients within the user's social network with respect to the specific or similar communications;

wherein determining projected consequences if the social behavioral pattern continues, further comprises determining a weighted value, based, at least in part on: an impact on a communications system if the social behavioral pattern continues; an impact on a recipient if the social behavioral pattern continues; an impact on the communications system if an anti-pattern to the social behavioral pattern continues; and an impact on the recipient if an anti-pattern to the social behavioral pattern continues; and program instructions to present, by one or more computer processors, the recommendation for how to manage the specific communication.

10. The computer system of claim 9, wherein program instructions to request accessible data for the specific communication, further comprise program instructions to retrieve one or more of:
message metadata;
user metadata; and
communications server information.

11. The computer system of claim 9 wherein program instructions to determine a social behavioral pattern, further comprise program instructions to determine a weighted value, based, at least in part on, one or more of:
historical behavioral patterns relating to the specific or similar communications;
functional proximity of a plurality of recipients within the user's social network to the user;
a history of how communications are managed by a plurality of recipients with similar job responsibilities to the user; and
developing trends among a plurality of recipients that meet or exceed a predetermined threshold.

* * * * *